United States Patent [19]

Fieder et al.

[11] Patent Number: 4,564,666

[45] Date of Patent: Jan. 14, 1986

[54] URETHANE ACRYLATES BASED ON POLYEPICHLOROHYDRIN POLYETHER DIOLS AND OPTICAL FIBER COATINGS BASED THEREON

[75] Inventors: Donald W. Fieder, Chicago; Joseph J. Stanton, Buffalo Grove; Christopher E. Fisher, LaGrange; Orvid R. Cutler, Jr., Rolling Meadows, all of Ill.

[73] Assignee: DeSoto, Inc., Des Plaines, Ill.

[21] Appl. No.: 710,337

[22] Filed: Mar. 11, 1985

[51] Int. Cl.$^4$ ............................................. C08G 18/67
[52] U.S. Cl. .......... 522/33; 528/67; 528/49; 8/115.53
[58] Field of Search ............... 528/49, 69; 204/159.16, 204/159.19

[56] References Cited

U.S. PATENT DOCUMENTS

| | | | |
|---|---|---|---|
| 4,131,602 | 12/1978 | Hodakowski et al. | 528/49 |
| 4,133,723 | 1/1979 | Howard | 528/49 |
| 4,233,425 | 11/1980 | Tefentiller et al. | 528/69 |
| 4,246,391 | 1/1981 | Watson | 528/49 |
| 4,451,627 | 5/1984 | Frisch et al. | 528/69 |

*Primary Examiner*—Maurice J. Welsh
*Attorney, Agent, or Firm*—Dressler, Goldsmith, Shore, Sutker & Milnamow, Ltd.

[57] ABSTRACT

A liquid ultraviolet-curable coating composition contains at least 45% up to 95% by weight of acrylated polyurethane-based oligomer comprising at least 10%, based on the total weight of polymerizable material, of an acrylated polyurethane-based ultraviolet-curable oligomer in which the oligomer is the reaction product of an organic diisocyanate with an polyepichlorohydrin polyether diol having a number average molecular weight of from about 1,000 to about 15,000, this reaction product being capped at each end thereof with a monohydric acrylate. At least about 5% up to 55% of the composition is a liquid acrylate-functional compound providing the coating composition with coating viscosity.

7 Claims, No Drawings

URETHANE ACRYLATES BASED ON POLYEPICHLOROHYDRIN POLYETHER DIOLS AND OPTICAL FIBER COATINGS BASED THEREON

DESCRIPTION

1. Technical Field

This invention relates to the coating of optical glass fibers with coatings having improved water resistance and to polyurethane polyacrylate oligomers which are useful to provide such coatings.

2. Background Art

The coating of optical glass fibers has presented the coating industry with a new challenge. The fibers must be coated and the coatings cured on the fiber with great rapidity. This has necessitated the use of coatings which cure rapidly on exposure to ultraviolet light.

The function of the coating is to protect the glass surface of the fiber against abrasion which can interfere with the capacity of the fiber to transmit optical images. However, the ultraviolet-cured coatings must satisfy many requirements, some of which are unique to the optical fiber utility.

One problem is the difference between the thermal coefficients of expansion of the glass and of the coating. This difference has produced microbending difficulties when the coated optical fibers encounter low service temperatures at which the coatings become hard and transmit strains to the glass. The resulting sharp microscopically-sized bends can interfere with the capacity of the coated fiber to transmit an optical image.

One cannot merely use a coating which is so soft that it remains soft at low temperatures, for then the coating lacks the strength to resist mechanical stress at room or somewhat elevated temperature. Such mechanical stresses result from normal handling and cabling operations. This is because a buffer coating (the coating which contacts the glass surface) must not only cure rapidly and have the aforesaid wide range of appropriate physical properties, but it must also have a relatively high index of refraction, preferably above 1.48.

While buffer coatings which contact the glass surface of the optical fiber present a particularly difficult problem, it is also common to overcoat or topcoat the previously applied buffer coating in order to supplement the strength and toughness of the coated fiber at room and elevated service temperatures. While these topcoatings may be harder at low temperature than would be permitted for a buffer coating, they still must possess an unuusually broad range of properties in which good room temperature toughness is coupled with limited low temperature hardness.

Regardless of whether we concern ourselves with buffer coatings or topcoatings for optical glass fibers, water is another hazard which must be resisted. Water can penetrate through the coating to the glass surface to etch the glass surface and interfere with light transmission through the fiber. This is a problem in normal service where the fibers need merely resist the water in the atmosphere, but extensive underwater use of optical glass fibers is now contemplated. Thus, the capacity to resist water is another important criteria. Accordingly, an objective of this invention is to provide ultraviolet-curable coatings which are appropriate for application to optical glass fibers and which possess improved resistance to water absorption. As a result, the coatings and the glass surface of the optical glass fibers are better protected from attack by water. Ultraviolet-curable topcoatings of the character described are particularly contemplated.

Disclosure of Invention

In accordance with this invention, a liquid ultraviolet-curable coating composition containing at least 45% up to 95% by weight of acrylated polyurethane-based oligomer includes at least 10%, based on total polymerizable material, of a particular acrylated polyurethane-based ultraviolet-curable oligomer. This particular oligomer is the reaction product of an organic diisocyanate with a polyepichlorohydrin polyether diol having a number average molecular weight of from about 1,000 to about 15,000, this reaction product being capped at each end thereof with a monohydric acrylate, like 2-hydroxyethyl acrylate.

The liquidity of the composition is provided by at least about 5%, preferably at least 20%, up to 55%, of a liquid which is rapidly polymerized with ultraviolet radiation, preferably an acrylate-functional compound, and which dissolves the acrylated oligomers to provide a single phase liquid having a viscosity appropriate for coating. Liquid monomeric monoacrylates, for example, isobornyl acrylate, are preferred, but many other liquid monomeric acrylates and polyacrylates can be used, like ethoxyethoxy ethyl acrylate, phenoxyethyl acrylate, butoxyethyl acrylate, 2-ethylhexyl acrylate, dimethyl acrylamide, dimethylaminoethyl acrylate, 1,4-butane diol diacrylate, 1,6-hexane diol diacrylate, trimethylol propane di- and triacrylate and pentaerythritol triacrylate. Other suitable liquids are illustrated by N-vinyl pyrrolidone.

If the viscosity of the composition is too high, heat can be applied during application to reduce the viscosity. Volatile solvents cannot be tolerated for viscosity reduction, for this would slow the ultraviolet curing process.

The acrylated polyurethane-based ultraviolet-curable coating compositions of this invention preferably cures to provide properties suitable for the topcoating of buffer-coated optical fibers. However, the acrylated polyurethane oligomers of this invention when used alone, produce a coating having a relatively low tensile strength, so these are preferably admixed with the known acrylated polyurethane oligomers to increase the tensile strength of the resulting coatings. This is especially desirable in topcoating formulations so that the conventional oligomers can supplement the limited strength possessed by the acrylated oligomers used in this invention. Blends of the acrylated oligomer of this invention with the conventional acrylated oligomers will preferably contain the two in a weight ratio of about 30:70 to about 70:30.

The polyepichlorohydrin polyether diols suitable for use in this invention have a number average molecular weight of from about 1,000 to about 15,000, as previously indicated, and these include diols that are available from B. F. Goodrich, Cleveland, Ohio, under the trade designation Hydrin 10X1 and Hydrin 10X2. The Hydrin 10X1 product has a number average molecular weight of about 4,000 and is preferred for use herein. The Hydrin 10X2 is also useful, and it has a number average molecular weight of about 12,000. These diols are linear polyepichlorohydrin polymers in which each epichlorohydrin group is joined to the next by an ether group, and the linear molecular is terminated at each end with an hydroxy group.

A wide variety of organic diisocyanates can be used in the present invention. Isophorone diisocyanate is a typical organic diisocyanate for use herein and is illustrative. The organic diisocyanates may be aromatic or aliphatic, but the aliphatic diisocyanates produce a coating having greater flexibility, and this is especially desired in buffer coating formulations. One may use toluene diisocyanate or meta-phenylene diisocyanate, or any other organic diisocyanates known for this purpose. Also, excess organic diisocyanate can be reacted with difunctional materials including low molecular weight diols, diamines, or mixtures thereof, such as ethylene glycol, butylene glycol or butylene diamine, to provide a higher molecular weight diisocyanate which can then be reacted as described herein.

The monohydric acrylates which may be used to end cap the isocyanate functional oligomers used herein may be any acrylate-functional monohydric alcohol, typically 2-hydroxyethyl acrylate. 2-hydroxypropyl acrylate and 2-hydroxybutyl acrylate can also be used. Trimethylol propane diacrylate or pentaerythritol triacrylate further illustrate the class of useful materials.

The polyacrylate oligomers of this invention may be made in various ways, these being generally equivalent. For example, a polyepichlorohydrin polyether diol can be reacted with two molar proportions of a diisocyanate and the resulting isocyanate-functional oligomer can be end capped with a monohydric acrylate. However, it is preferable to prereact one molar proportion of the monohydric acrylate with one molar proportion of the diisocyanate to form an unsaturated monoisocyanate which is then reacted with the diol, either alone or together with additional diisocyanate.

The foregoing provides a composition in liquid form without the presence of a volatile organic solvent which slows the cure cure since the solvent must be removed prior to ultraviolet exposure. As a result, unsaturated liquids can be rapidly polymerized upon ultraviolet exposure, as previously described, are used to dissolve or thin the polyacrylate polyurethane to coating viscosity. These polymerizable liquids are usually acrylate-functional and may be selected to soften or harden the cured coating, as desired.

Other components of a typical coating composition are conventional, including stabilizers, like phenothiazine, and initiators, like acetophenone or other ketonic photoinitiators, such as benzophenone or acetophenone. Silicone oils may also be present.

Throughout this application, all proportions are by weight unless otherwise specified, and the term polyacrylate is used to describe a plurality of acrylic acid ester groups, which is a conventional use of this language.

The invention is illustrated in the example and comparisons which follow.

EXAMPLE 58.05 grams of 2-hydroxyethyl acrylate are added over a period of about 20 minutes to a mixture of 111.15 grams of isophorone diisocyanate, 1.115 grams of phenothiazine, 1.115 grams of 2,6-t-butyl 4-methyl phenol and 0.69 gram of dibutyl tin dilaurate in a reactor. The reactor is cooled with a water bath and the contents thereof are stirred for about 20 minutes after the addition is complete.

775 grams of polyepichlorohydrin polyether diol having a molecular weight of about 4,000 (Hydrin 10X1 may be used) is mixed with 332.8 grams of isobornyl acrylate and the mixture is added to the reactor over a period of about 13 minutes. After the addition is complete, the reactor is stirred for about 7 minutes and then 2.33 grams of dibutyl tin dilaurate are added. After agitation for about 2 minutes the mixture in the reactor is heated to about 50° C. and is held at 50° C.-65° C. for about 3 hours and 15 minutes.

Then, to consume unreacted isocyanate functionality 26.3 grams of a mixture of polyepichlorohydrin polyether diol and isobornyl acrylate (weight ratio=775:333) are added while maintaining the above reaction temperature and agitation is continued for about 40 minutes. 50.5 grams of the same diol-isobornyl acrylate mixture are then added and agitation is continued for another 40 minutes. Then another 50.9 grams of the same diol-iosbornyl acrylate mixture are added and the reaction is terminated after an additional 38 minutes at which point residual isocyanate functionality is negligible.

In order to test the characteristics of the above-described polyacrylate polyurethane oligomer-containing composition, 98.78 parts of the above composition is combined with 1.00 part of benzophenone and 0.22 parts of 2,2-dimethoxy 2-phenyl acetophenone (the commercial photoinitiator Irgacure 651 from Ciba-Geigy, Ardsley, N.Y., may be used). This coating composition is applied to a glass substrate and is cured with ultraviolet light to provide a free film 3.0 mil in thickness. The film has a tensile strength of 520 psi., an elongation of 130%, a tensile modulus at 2.5% elongation of 1450 psi., and a rupture strength of 530 inch pounds per cubic inch.

While this coating can be used as a primer or buffer coating for optical glass fibers, its modulus is higher and its rupture strength is lower than preferred for commercial use. The water resistance of such a film is quite good in that 24 hour immersion in deionized water causes a water absorption of only about 1.0%. The water absorption percentage is the difference between the weight of the film after immersion and the original weight of the film, divided by the original weight of the film and multiplied by 100 to provide a percentage figure.

A buffer coating for glass fibers now in commercial use is based on a polyacrylate polyurethane polyurea in a liquid coating composition containing the same together with 6.83% vinyl pyrrolidone, 31.96% phenoxyethyl acrylate, 2.92% diethoxy acetophenone and 0.01% phenothiazine. The polyacrylate polyurethane polyurea is made using 17.49 parts Desmodur W diisocyanate, 32.93 parts polypropylene glycol of molecular weight 1025, 3.91 parts polyoxypropylene diamine of molecular weight 230, and 3.86 parts 2-hydroxyethyl acrylate. The diisocyanate is reacted in the presence of 0.06 part of dibutyl tin dilaurate and 0.03 part of 2,6-t-butyl 4-methyl phenol. This buffer coating also contains 0.01% of phenothiazine. The above percentages are based on the total weight of the composition.

When this commercial buffer coating composition is applied to a glass substrate and is cured with ultraviolet light to provide a free film 3.0 mil in thickness, it provides a film having a tensile strength of 500 psi., an elongation of 170%, a tensile modulus at 2.5% elongation of 500 psi., and a rupture strength of 1300 inch pounds per cubic inch. These values are significantly better than were obtained for the polyepichlorohydrin polyether diol-based composition, but the water resistance is not as good. In particular, while the polyepichlorohydrin polyether diol-based composition absorbed only 1.0% of water, the above commercial buffer coating composition under the same test conditions absorbed about 3.1% water.

A 50:50 blend of the above two compositions possesses intermediate properties of elongation and tensile modulus, so it is a better buffer coating than the polyepichlorohydrin polyether diol-based composition though not as good as the commercial control. On the other hand, the blend absorbed only 1.9% of water in the water immersion test, so the water resistance of the blend is significantly better than the commercial control.

A topcoat composition now in commercial use contains 53.67% polyacrylated polyurethane oligomer in combination with 17.38% bisphenol A diacrylate, 11.58% tetraethylene glycol diacrylate, 8.72% trimethylol propane triacrylate, 0.44% 2,2-dimethoxy 2-phenyl acetophenone, 0.01% phenothiazine, 0.03% benzil, 2.01% benzophenone, 0.67% diethyl amine, 0.20% silicone fluid (Dow Corning product DC 57) and 0.60% silicone fluid (Dow corning product DC 190).

When this commercial topcoat composition is applied to a glass substrate and is cured with ultraviolet light to provide a free film 3.0 mil in thickness, a film having a tensile strength of 2700 psi., an elongation of 17%, a tensile modulus at 2.5% elongation of 50000 psi., and a rupture stength of 850 inch pounds per cubic inch.is produced. This much stronger coating serves well as a topcoat over the previously cured buffer coating described previously, but its water resistance is not as good as is desired. Thus, after 24 hour immersion in deionized water, the water absorption was 4.1% to 4.2%.

In contrast, a 50:50 blend with the polyepichlorohydrin polyether diol-based composition described previously provided a considerable improvement. The tensile strength was essentially unchanged, though the elongation increased to 40%, the tensile modulus decreased to 13690 psi., and the rupture strength decreased to 750 inch pounds per cubic inch. However, these changes do not prevent use of the composition as a topcoat. On the other hand, the water absorption was only 2.3% to 2.4%, which is far less than the 4.1% to 4.2% water absorption obtained for the commercial control.

What is claimed is:

1. A liquid ultraviolet-curable coating composition containing at least 45% up to about 95% by weight of acrylated polyurethane-based oligomer comprising at least 10%, based on the total weight of polymerizable material, of an acrylated polyurethane-based ultraviolet-curable oligomer in which the oligomer is the reaction product of an organic diisocyanate with a polyepichlorohydrin polyether diol having a number average molecular weight of from about 1,000 to about 15,000, said reaction product being capped at each end thereof with a monohydric acrylate, and at least about 5% up to 55% of the composition being a liquid which is rapidly polymerizable with ultraviolet radiation to provide said composition with coating viscosity.

2. A liquid coating composition as recited in claim 1 in which said liquid which is rapidly polymerizable with ultraviolet radiation is an acrylate-functional compound.

3. A liquid coating composition as recited in claim 2 in which said acrylate-functional compound is a monomeric monoacrylate.

4. A liquid coating composition as recited in claim 2 in which said liquid acrylate-functional compound is present in an amount of at least 20%.

5. A liquid coating composition as recited in claim 1 in which said composition is curable provide cured properties suited to the topcoating of buffer-coated optical fiber.

6. A liquid coating composition as recited in claim 1 in which said acrylated polyurethane based on polyepichlorohydrin polyether diol is used in admixture with another acrylated oligomer in a weight ratio of about 30:70 to about 70:30.

7. A liquid coating composition as recited in claim 1 in which a ketonic photoinitiator is present to render the composition curable upon exposure to ultraviolet light.

* * * * *